July 29, 1958 P. HALPERT ET AL 2,845,239
OBJECT CONTROLLING SERVO SYSTEM
Original Filed May 6, 1949 2 Sheets-Sheet 2

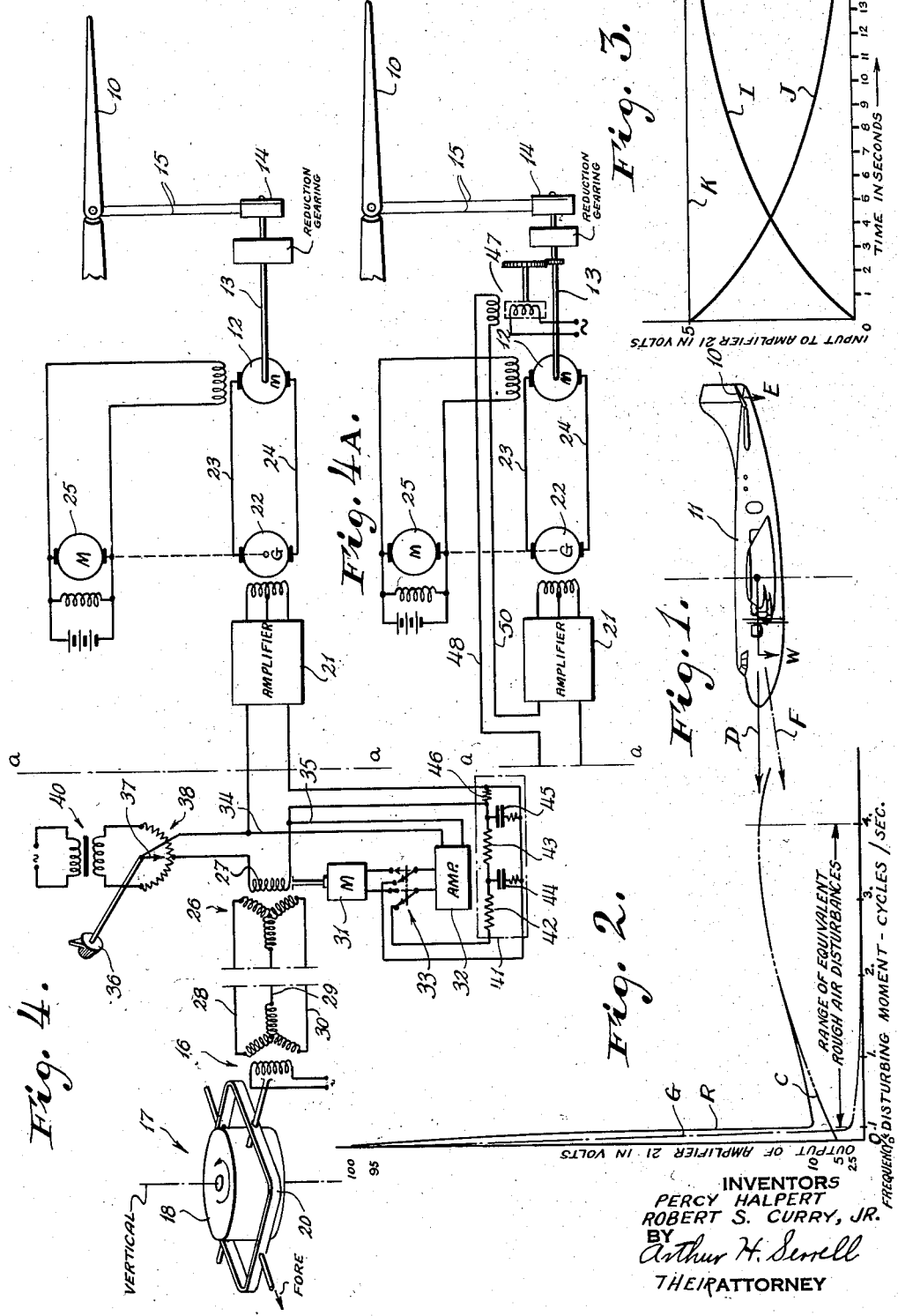

INVENTORS
PERCY HALPERT
ROBERT S. CURRY, JR.
BY
Arthur H. Serrell
THEIR ATTORNEY

United States Patent Office 2,845,239
Patented July 29, 1958

2,845,239

OBJECT CONTROLLING SERVO SYSTEM

Percy Halpert, Hempstead, and Robert S. Curry, Jr., Baldwin, N. Y., assignors to Sperry Rand Corporation, a corporation of Delaware Original application May 6, 1949, Serial No. 91,844. Divided and this application February 8, 1955, Serial No. 486,769

9 Claims. (Cl. 244—77)

This invention relates to object controlling servo systems of a type in which the object is movable about an axis due to disturbing moments of transient and persistent characters and is a division of our copending application Serial No. 91,844, filed May 6, 1949, now abandoned, and assigned to the same assignee as the present application. The invention is particularly adapted for use in automatic pilots for dirigible craft or aircraft where the craft is the object and the craft's control surface is the controller which facilitates corrective movement of the object about one of its axes.

The present invention is particularly concerned with the reduction in the magnitude of the displacement error in a system of this character when a persistent disturbing moment about the axis of the movable object or craft is encountered. The term "displacement error" will be understood to mean the departure in the aircraft attitude from a reference attitude established prior to the sustained disturbance in aircraft trim. Errors of this type are inherent in all systems where displacements from a reference position are used to generate control signals, and these signals acting through a suitable control system produce restoring forces or moments on or about the object or craft in a sense to restore the object or craft to its reference position. Persistent disturbing forces or moments acting to move the object or craft require a sustained displacement of the object or craft from its reference position to generate an error signal which acting through the control system will produce an equal but opposing force or moment. These persistent disturbances can be either external or internal to the control system. The object of the present invention is to eliminate this characteristic displacement error so that the object or craft can be restored to its reference position.

A further object of the invention is to reduce the displacement error created in automatic pilots employing position feedback in the control surface servo system. In this case, a displacement of the object or craft from its reference position is required to compensate for position feedback signal arising from a new control surface position.

A still further object of the invention is to obtain the same result in automatic pilots for aircraft employing both a main control surface and a trim tab for moving the same about an axis. In this form of the invention, the improved automatic pilot functions to relieve sustained cable effort on the main control surface of the craft so that the automatic pilot may be disengaged with safety at any time.

Other objects, features and structural details of the invention will be apparent from the following description when read in relation to the accompanying drawing, wherein:

Fig. 1 is a side elevation of an object in the form of an aircraft employing a servo system or automatic pilot in which the present inventive concepts are incorporated;

Figs. 2 and 3 are curves used in explaining the operation of the system shown in Figs. 4 and 4A;

Fig. 4 is a circuit diagram and schematic view of a servo system or automatic pilot embodying the present inventive concepts;

Fig. 4A is a view similar to Fig. 4 in which the system is particularly directed to automatic pilot for aircraft employing displacement repeatback means in the servo system;

Figure 5:
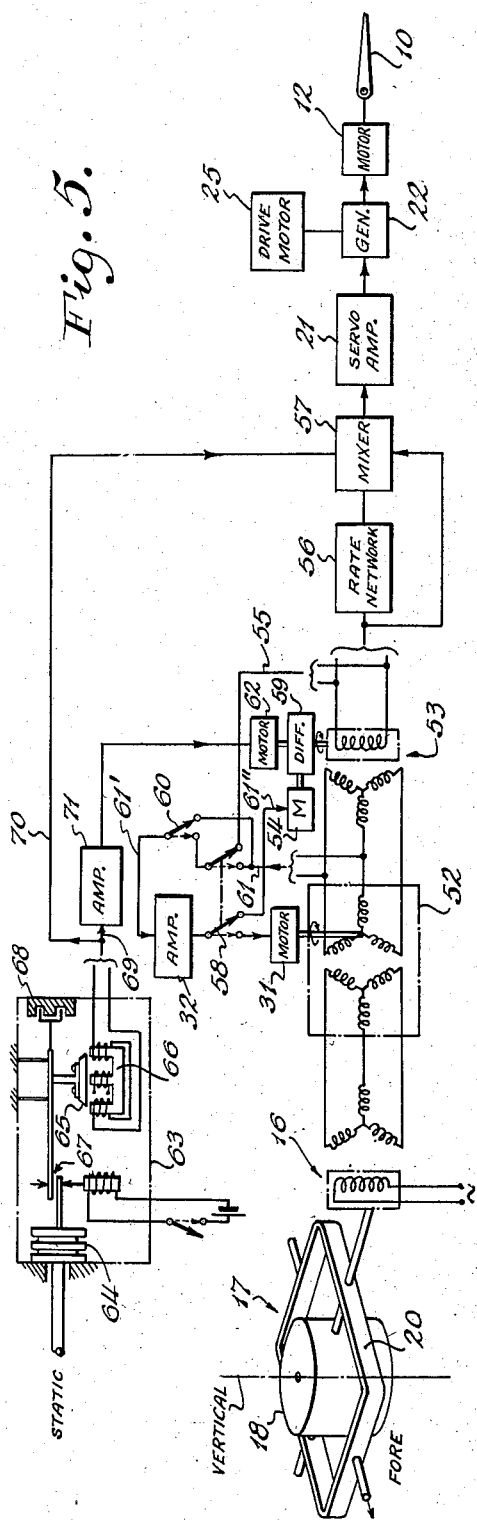
Fig. 5 is a view similar to Fig. 4 showing a modified form of the invention.

With particular reference to the form of the invention illustrated in Fig. 4, the improved servo system or automatic pilot is shown to include means for moving a body in the form of an aircraft 11 about its pitch or lateral axis. As shown, the moving means may be the control surface or elevator 10 of the craft 11 together with a motor 12 operatively connected to the control surface by way of shaft 13, suitable reduction gearing, drum 14 and cables 15. Primary signal means are also provided for operating the moving means with displacement of the object or craft 11 from a reference position about its lateral axis in this instance. The signal means illustratively shown herein is a selsyn transmitter or other pick-off 16 which may be located at the pitch or inner gimbal axis of a gyro vertical 17. As shown, the single phase wound rotor of pick-off 16 may be stabilized in pitch by mounting the same in fixed relation to the gyro rotor case or frame 18 of the gyro vertical. The three phase wound stator of the pick-off 16 may be fixedly mounted on the ring 20 of the gyro vertical in a well-known manner. The gyro vertical is mounted in the craft so as to provide a reference for detecting changes in attitude of the craft about its pitch axis, in this instance. It will be understood that other equivalent means may be used to position one of the parts of a pick-off so as to detect displacement of the craft or any object from a reference position about any desired axis thereof. The rotor of pick-off 16 is energized from a suitable source of alternating current electrical energy.

When the craft or object is at its reference position, the stator of pick-off 16 in conjunction with stator of the monitoring transmitter or synchro device 26 provides a null output from its rotor 27. With a departure of the object or craft from its reference position, the pick-off 16 provides a control signal output from rotor 27 for operating motor 12 whose direction of rotation depends on the direction of such departure and whose magnitude depends on the amplitude of the displacement.

As herein shown, the signal of synchro device 26 is supplied to motor 12 by way of an amplifier 21 of conventional form which in the servo system or automatic pilot illustrated is arranged to operate the elevator motor through the agency of a motor-generator set of the Ward-Leonard type. Thus, as shown, the output of amplifier 21 energizes the field circuits of a direct current generator 22, the armature circuit of which energizes the armature of motor 12 by way of leads 23 and 24. Generator 22 is driven by a motor 25 that is rotating at a constant speed. The D. C. power supplied to motor 25 also energizes the field windings of motor 12, as shown. In the illustrated embodiment of the invention, it will be understood that the gyro vertical is mounted in craft 11 with its minor axis parallel to or coincident with the pitch axis of the craft.

In order to maintain the craft in a trim condition about its pitch axis for a given loading, the effective output of pick-off 16 is nullled by the synchro device 26 whose rotor 27 is in the circuit including the amplifier 21. This is to permit the craft to fly at a slightly different angle than that required by the reference instrument 17 and pick-off 16. As shown, the stator of synchro device 26 is fed from the output of pick-off 16 by way of leads 28, 29 and 30. The rotor 27 of device 26 may be positioned by means of a motor 31 that is energized by the output of an amplifier 32 that is connected to the motor by way of a double pole, double throw switch 33. In this form of the invention, the input for amplifier 32 is obtained from a circuit including leads 34 and 35 that are in parallel with the input circuit to amplifier 21.

In synchronizing the system prior to engaging the control for automatic flight, switch 33 is set in the dotted line position shown in Fig. 4 and the craft, in this instance, is flown at the desired attitude. Any output from pick-off 16 to amplifier 21 under such conditions reflects in an input to amplifier 32 whose output drives motor 31 so that the output of the combined pick-off 16 and device 26 is zero. This defines a reference position about the pitch axis of the craft and departure from this position is detected or measured by pick-off 16. When the servo system or automatic pilot is engaged, switch 33 is simultaneously thrown to its full position in Fig. 4.

The conventional form of automatic pilot may further include means for changing the reference attitude of the aircraft after the automatic pilot is engaged. Such means is shown in the drawing by a manually settable knob 36, movable arm 37, connected to the knob and potentiometer 38 of which the movable arm is a part. The potentiometer may be energized from a suitable source of alternating current electrical energy by way of transformer 40. The potentiometer 38 is included in series with the rotor of device 26 in the input circuit to amplifier 21. In synchronizing the system or automatic pilot with switch 33 in its dotted line position in Fig. 4, although contrary to good practice, it will be understood that knob 36 need not be located in its central position since rotor 27 will be positioned to produce an equal but opposing signal to nullify the signal from potentiometer 38.

The elements of the servo system or automatic pilot described to this point are well known. In operation as a result of disturbing moments of a transient character, the system functions by deriving a control signal from pick-off 16 as the craft or object departs from its reference position, creating a moment that is effective to restore the craft or object to its reference position. The concept of frequency response is used in the subsequent discussions because this method of evaluating a control system is used most commonly. This concept has long been used in the radio and telephone arts to express the fidelity of response of equipment, and as a result a considerable background of established mathematics and experimental procedure has been made available to instrument and automatic control engineers.

A transient analysis of the response of an automatic control to some standard type of disturbance is an accepted procedure. However, with the more complex systems it becomes unwieldly, and useful design criteria become increasingly difficult to develop. It can be shown that a frequency analysis based on the mathematics of the Fourier series and the Fourier integral provides information equivalent to the transient analysis but with much less calculation and with more easily interpretable results.

With reference to Fig. 2, the abscissa scale represents the frequency of the disturbing moment measured in terms of cycles per second of sinusoidal motion of the craft or object about some principal axis. For purposes of the present application, disturbing moments created by rough air action will be considered as one source of craft disturbance. Experience has shown that rough air transients can be simulated by sinusoidal disturbing moments having frequencies within the band ranging from .1 cycle per second to 4.0 cycles per second. The system or automatic pilot of the present invention functions in conventional manner when responding to disturbances that fall within this band. Where the disturbing moment has a frequency that is less than .1 cycle per second, it is herein termed a persistent moment. The ordinate scale of the curves in Fig. 2 represents the output signal of the amplifier 21 which is the controlling voltage of the system. Heretofore, the control voltage of the system varied with the frequency of the sinusoidal disturbing moment as indicated by curve C of Fig. 2.

As exemplary of a moment whose frequency is less than .1 cycle per second, it will be assumed that a craft flying in the direction designated by the horizontal arrow D in Fig. 1, has a bomb load released from aft of the center of gravity of the craft. This change in loading in general will cause the center of gravity to shift further forward than the shift in either the center of lift or center of pressure, thereby creating a nose down pitching moment W as indicated in Fig. 1. As shown in Fig. 1, this persistent moment is balanced by operation of the system or automatic pilot to maintain elevator 10 in an up position so that a balancing moment is exerted about the center of gravity of the craft whose force is indicated at E. This requires a continuous up elevator signal from the automatic pilot which is obtained from the pick-off 16 by reason of the fact that the nose of the craft is then pointed downward as indicated by arrow F, and the craft continues to fly in the direction of arrow D in an out of trim condition, since a sustained error is required to maintain a sustained control correction. With such a condition, the signal from pick-off 16 does not restore the craft to its reference position about its pitch axis. In this instance, the pick-off 16 maintains an output from amplifier 21 to locate the control surface or elevator 10 displaced from its normal or central position. This system thus operates under conditions of a persistent disturbing moment balanced by a control moment about the axis of the craft with a herein termed displacement error signal from pick-off 16. At such time, it will be understood that the attitude of the craft about its pitch axis is displaced from its reference position so that the output from pick-off 16 is obtained.

In accordance with the teaching of the present invention, means are provided for producing an additional signal for operating motor 12 which in this form of the invention effectively supplements the displacement error signal of the primary pick-off 16. As shown in Fig. 4, such means for operating motor 12 of the system is in the form of a circuit, the output of which is monitored by the signal of pick-off 16. This circuit includes amplifier 32 and an integrating network indicated at 41 provided, in this instance, by resistors 42, 43 and condensers 44, 45. The direct current output of the network 41, taken across capacitor 45 and impressed across resistor 46 is in series in the input circuit to amplifier 21. The network 41 is included in the system when switch 33 is in its normal full line position as shown in Fig. 4.

The output of amplifier 21 due to this additional signal means in the system is indicated by curve G in Fig. 2. This control signal is only effective with persistent disturbing moments about the axis of the craft. With disturbances above .1 cycle per second, the output of this additional signal means is relatively small and therefore does not interfere with the noted functioning of the system at such time. The double integrating network is provided in this instance to obtain sharper cut-off characteristics. Curve R in Fig. 2 shows the resultant output of the amplifier 21 by reason of the combined primary signal source or pick-off 16 and the second signal source provided by the tapped leads 34, 35, amplifier 32 and the integrating network 41 for different disturbing moments.

The transient curves in Fig. 3 illustrate the operation of the system or automatic pilot when a disturbing moment of persistent character is suddenly applied to the system. The abscissa scale of this figure represents a time axis and the ordinate scale indicates the input to the amplifier 21 in volts. A constant signal K is shown illustratively in this figure as the signal required at the input to amplifier 21 to maintain surface 10 in the position in which it is illustrated in Fig. 1 to balance a given persistent disturbing moment. Heretofore, signal K was provided necessarily by only the output of pick-off 16. In accordance with the described form of the present invention, this signal is now substantially replaced by the output of network 41 shown by curve I which builds up approximately to the value of signal K as time elapses. Curve J shows the change in the signal output of pick-off 16 with passage of time. This signal, as shown by curve J, approaches a value of zero because it is not necessary for the craft to fly at the inclined attitude or position necessary to continuously produce the relatively constant control signal or voltage K from only pick-off 16. Curve K is the summation of curves I and J. From Fig. 3, it will be understood that with disturbing moments that exist for only a fractional part of a second, the integrating means or network 41 blocks the output signal from amplifier 32 so that the same does not effectively influence the input to amplifier 21. The amplifier 32 and integrating network 41 form a means responsive to the signal of the displacement measuring means or pick-off 16 that provides a second signal in accordance with the effect on the object or craft of only persistent disturbing moments. The signals of pick-off 16 and network 41 are combined in a combining means in the manner shown in Fig. 3 to provide a substantially constant control signal as indicated at K for the automatic pilot or servo system that corrects for the effect of persistent disturbing moments.

In operation of the system with a persistent disturbing moment, the initial control signal comes from pick-off 16. This moves elevator 10 to the position shown in Fig. 1 by which a counter-balancing moment for the disturbing moment is provided. At such time, the craft has moved about its pitch axis away from its reference to an extent necessary to provide the required output from the displaced parts of pick-off 16. As the signal from pick-off 16 is continuous, with passage of time a signal builds up across resistor 46 as noted in curve I that is also effective to hold elevator 10 in the position shown in Fig. 1. The magnitude of signal I depends on the characteristics of amplifier 32. The rate at which the signal I builds up depends on the characteristics of the network 41. As this signal builds up and approaches the total voltage K necessary to position the elevator, less signal is required from pick-off 16 and the craft moves about its pitch axis in a direction to return the craft to its reference position.

Upon discontinuance of the persistent disturbing moment by retrimming the craft by adjusting either the trim tab or trim potentiometer 38, resistor 46 functions to discharge the condensers 44, 45 and reduce the integration voltage to zero. Condensers 44, 45 charge with an output from amplifier 32. When the amplifier output is reduced to a null point, any charges in the condensers is dissipated by resistor 46 which is in series therewith and the output of the network 41 falls to zero rapidly.

In the form of the invention shown in Fig. 4A, the automatic pilot includes displacement repeatback means in the form of a selsyn device indicated at 47. The rotor of device 47 is shown as positioned by shaft 13 driven from motor 12. The stator of device 47 is shown in series in the input circuit to amplifier 21 by means of leads 48, 50. With the surface 10 away from a null or central position, the device 47 provides a signal whose magnitude depends on the magnitude of the displacement. The output of device 47 is fed to amplifier 21 in opposition to the controlling input signal thereto from pick-off 16 and network 41. Displacement repeatback from the control surface to the system input is used to improve the system's fidelity. Fidelity is used in the sense of insuring that the system output, which in this case is position of the control surface, is proportional to the error signal and that the displacement faithfully follows the input control signal with negligible time lag relative to the craft response. Most control systems employ this form of repeatback since it produces better response characteristics than many other types.

With a persistent disturbing moment requiring a sustained deflection of the control surface, the device 47 provides a continuous output. This system consequently requires an initial displacement error signal from pick-off 16 that is greater than that required in the system of Fig. 4. However, the system functions in the same manner as that heretofore described, the corrective signal from resistor 46 opposing the signal of the repeatback device 47 replacing the signal from pick-off 16.

In the modified form of the invention shown in Fig. 5, the displacement error signal in the system due to a persistent disturbing moment is entirely eliminated. As shown, the output of pick-off 16 is fed to a differential synchro device 52, in this instance, the rotor of which is positioned by motor 31 in the manner heretofore described in connection with Fig. 4 so that the synchro device 52 provides a null output across two legs of the differential synchro stator when the craft's attitude about its pitch axis corresponds with the reference position desired of the same as defined by the gyro vertical 17. In this form of the invention, the signal of synchro device 52 is fed to the amplifier 21 by way of a second synchro device 53.

In the present instance, the differential synchro device 52 is used to synchronize the system to establish the desired reference attitude prior to engaging the control to monitor the aircraft's attitude. During this initial synchronizing phase switches 58 and 60 are located in the dotted line positions in Fig. 5. In this position, a reference signal output from the differential synchro device 52 is nulled out by motor 31 turning the synchro rotor through the control action of amplifier 32. The signal from synchro device 52 is fed to motor 31 by way of lead 61, switch 60, lead 61', amplifier 32 and switch 58. To insure there be no output signal from the second synchro device 53 at the time of engaging the automatic pilot, switch 58 is thrown to the solid line position. In this position the second motor 54 turns the rotor of synchro device 53 until the output voltage is zero. Sequence operation of switch 58 is controlled by the action of a conventional time delay control circuit which functions during the system warm-up period in a manner that allows sufficient time for both reference signals to be nulled out before the automatic pilot is engaged. When the automatic pilot is engaged, switch 58 is retained in the solid line position shown in Fig. 5, and switch 60 which has been in the solid line position to this point moves to the dotted line position. In this position the reference signal from synchro device 52, the null value indicating the craft reference attitude, is used to move the rotor of synchro device 53 to furnish a signal to amplifier 21 to produce motion of the control surface in the proper sense to maintain the reference attitude. In this form of the invention, the integrating means responsive to the displacement measuring means, or pick-off 16, includes amplifier 32 and motor 54. Amplifier 32 is connected to the input to the servo amplifier 21 by switch 58, lead 61" and motor 54. Motor 54 provides an element that with synchro device 53 is equivalent to the integrating network shown in Fig. 1. Device 53 driven by the motor 54 provides the second signal input to the servo amplifier as indicated at I in Fig. 3. The signal from synchro device 53 due to the operation of the motor 54 provides a measure of persistent disturbing moments only. The displacement error signal from pick-off 16 is replaced in this arrangement by a signal from device 53 whose rotor driven by motor 54 is positioned by a signal fed thereto by way of lead 55, switch 58, switch 60, amplifier 32, switch 58 and lead 61″. It is understood from good control practice that the action of motor 54 during this operation is sufficiently slow in order not to affect the basic stabilizing effects of the system to short period transient disturbing moments. The effective integral control action follows the same basic control principles used to explain the systems shown in Figures 4 and 4A.

A further control function can be employed in this control, which in this case is provided from an altitude controller device 63. It will be understood that airspeed, Mach number, and similar controller functions can also be used in this system. In this example, controller 63 is a barometric pressure sensitive device that generates electrical signals proportional to departures from an established reference altitude. This device is similar to the pressure sensitive device shown and described in U. S. Letters Patent 2,446,546, issued August 10, 1948, to A. W. Meston. The sensitive element or bellows 64 of the pressure operated device 63 is connected to the spring suspended armature 65 of signal pick-off 66 by means of the electrically operated clutch 67. When the clutch is not engaged the moving end of the bellows rides free and the armature 65 is centralized by the spring suspension producing zero signal output. The electromagnetic damping element 68 prevents undue movement of the armatue 65 due to vibration of the whole unit which would produce unwarranted control action. Functional engagement of altitude control device 63 is accomplished by engaging clutch 67 thereby producing a positive connection of the signal pick-off armature 65 to the moving end of the bellows 64. Thus, changes in altitude which are registered by corresponding changes in pressure result in a direct movement of the pick-off armature generating an electrical output signal for control purposes. This signal is transmitted to the subsequent controller elements over leads 69 and 70.

The altimeter device 63 thusly provides an altitude responsive means which operating through the supplementary control system acts to move the craft's control surface 10 in the proper sense to restore the craft to the altitude established at the time of engagement. The signal introduced into the system by lead 70 is in the form of conventional control action which acts to change the pitch attitude of the craft to correct for short period altitude errors. The altitude control signal introduced into amplifier 71 by lead 69 controls motor 62. Motor 62 acting through the mechanical differential unit 59 turns the rotor of signal synchro device 53 creating an output control signal that is a part of the invention. It will be understood that the time required to effect an altitude control correction through amplifier 71, motor 62 and differential 59 will be in the order of 100 times longer than the corresponding correction that would appear as a result of the introduction of the signal into the system by lead 70. This form of the invention would normally be used where direct control action, as in this example the introduction of the altitude error signal into servo amplifier 21 by lead 70, would not maintain the altitude within certain desired limits. This system operates in the same manner described in connection with the system shown in Figs. 4 and 4A where a sustained altitude error will create an additional control signal of a sustained nature that will slowly eliminate the sustained reference error. The output of synchro device 53 may be fed to amplifier 21 by way of a circuit including a rate network 56 and a mixer 57. Mixer 57, as shown, also receives the output of pick-off 66 by way of lead 70 affording conventional short-period altitude control for the craft.

Figure 6:
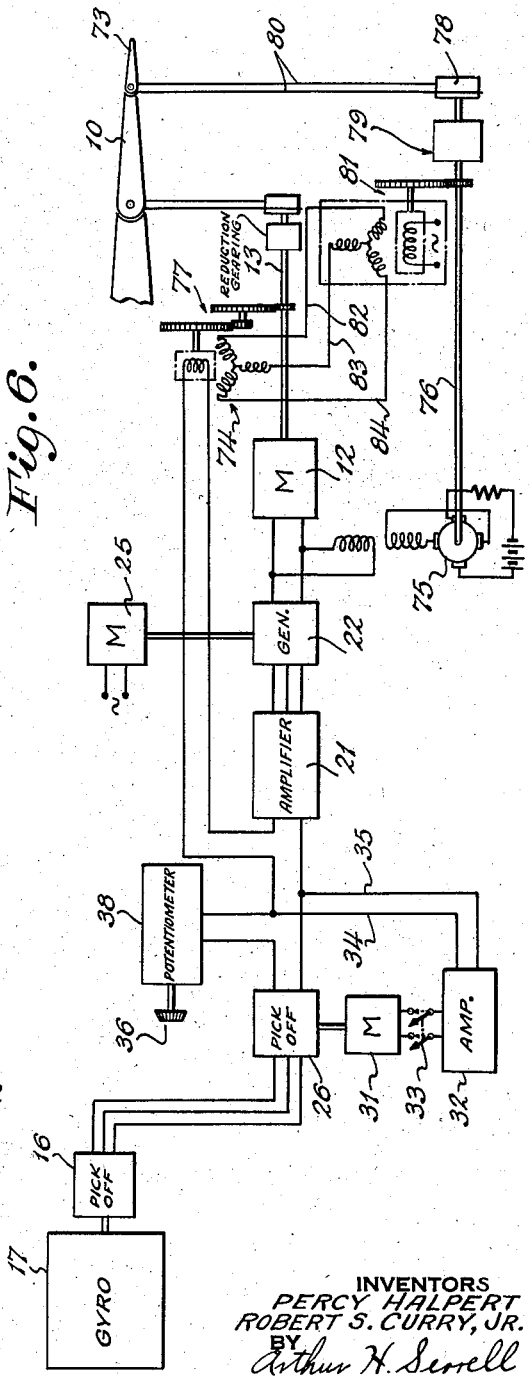
Fig. 6 is a further view similar to Fig. 4 showing a further modification of the invention as particularly directed to automatic pilots for aircraft employing both a main control surface and a trim tab for moving the same about an axis.

Fig. 6 shows a further modification of the invention in an automatic pilot for aircraft provided with a trim tab surface 73 as well as the main control surface 10 for controlling the craft about its pitch axis. This arrangement also includes a displacement repeatback means in the form of synchro device 74 mechanically coupled through gearing 77 to shaft 13 and to the control surface 10 similar to the device 47 shown in Fig. 4A. In this modified system, a portion of the output of generator 22 is employed to energize the field circuit of a motor 75 connected to trim tab 73 by way of shaft 76, reduction gearing 79, drum 78 and cables 80. The characteristics of motors 12 and 75 and associated gearing are such that motor 12 is primarily effective to move the main surface 10 to correct the craft when displaced from its reference position about its pitch axis due to transient disturbing moments and motor 75 is effective to move the trim tab 73 to correct the craft for persistent disturbing moments about the same axis. By use of the trim tab 73 in this arrangement, a sustained control effort from motor 12 resulting from a persistent disturbing moment is balanced out. In this form of the invention, the displacement measuring means is provided by pick-off 16. The selective means responsive to the signal of pick-off 16 that provides a second signal in accordance with the effect on the craft of only persistent disturbing moments is formed of the signal synchro 81. The rotor of synchro 81 is positioned by the signal of pick-off 16 by motor 75 and shaft 76 which also determines the position of the trim tab 73. The signal from synchro 81 provides the equivalent in this system to the signal I indicated in Fig. 3. The signal is combined with the signal of the pick-off 16 to operate amplifier 21 by way of the repeatback circuit in the same manner as shown in connection with the form of the invention illustrated in Fig. 4A as will be described. As herein shown, the stator of device 81 is connected to the stator of synchro device 74 by way of leads 82, 83 and 84. The signals from synchro device 81 effectively change the normal or neutral position of the main control surface 10 to eliminate the need for a balancing signal input to amplifier 21 generated from pick-off 16. This balancing effect is produced in the same manner that is employed in conventional synchro transmitter and receiver units used in gun control systems. Experience has shown that corrective moments about the craft center of gravity are not proportional to deflection of the control surface. If the non-linear characteristics are known then the gear train used to drive synchro device 81 from trim tab motor 75 can be equipped with elliptical gears or other suitable non-linear drives to introduce a balancing non-linear action in the signal circuitry.

The operation of the automatic pilot system illustrated in Fig. 6 is as follows. Assume that the craft is flying straight and level and is trimmed for a particular craft loading in which the control surfaces are, for example, streamlined. Assume also that this is the reference attitude of the craft as determined by the attitude reference provided by gyro 17. Under this condition the gyro signal from pick-off 16 is zero and the repeatback signal from elevator repeatback synchro 74 is also zero resulting in zero input voltage to control amplifier 21 and the elevator servomotor 12. Now assume that the distribution of craft loading changes due, for example, to the release of bombs or consumption of fuel, etc., which load change produces a sustained nose-down moment about the craft, e. g., as illustrated at W in Fig. 1. Normal automatic pilot operation will deflect the elevator 10 through a fly-up gyro signal to produce a balancing torque E. The aircraft now approaches level flight, i. e., the reference attitude, but will not reach this attitude since the elevator deflection must be maintained by a persistent torque on the elevator servo produced by a persistent gyro signal generated by the tendency of the craft to nose over due to the shift in craft loading. As a results, a persistent voltage at the output of amplifier 21 is required to maintain the elevator deflection. This persistent voltage is applied to trim tab motor 75 which operates in an amount dependent upon the length of time this persistent voltage is present and correspondingly deflects trim tab 73 in a direction such as to aerodynamically unload the elevator surface and allow the persistent voltage output from amplifier 21 to go to zero. However, under these conditions the gyro signal cannot go to zero because it must be present to balance the feedback signal from repeatback synchro 77 on elevator surface 10. As a result the craft flies along in an attitude, other than the reference attitude, as determined by the required signal from the gyro. In accordance with the present invention the aircraft may be allowed to return to its reference attitude. The trim tab surface repeatback signal from synchro 81 is used to shift the reference position of the main control surface by shifting the resultant voltage vector in the fixed field of elevator feedback synchro 74 thereby resulting in an effective shift of the neutral position of the elevator. This shaft will, of course, be in an amount proportional to the persistent displacement thereof as measured by the trim tab deflection. In this manner the repeatback signal from elevator synchro 77 is effectively reduced to zero and hence allows the persistent gyro signal to go to zero and in turn allows the craft attitude to return to its original reference attitude. At this point the craft is again flying straight and level in its reference attitude but has been automatically retrimmed for the new distribution of craft loading.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An automatic pilot for aircraft having a main control surface for moving said craft about an axis thereof to correct for transient moments thereof about said axis and a trim tab for moving said surface to correct the craft attitude for persistent moments about said craft axis, a first motor operatively connected to the main control surface, a second motor operatively connected to the trim tab, first means for producing a signal in accordance with displacement of the craft from a reference position about said axis and for supplying said signal to said motors, repeatback means for producing a signal in accordance with the displacement of the main control surface from a null position and for supplying the same to said motors in a sense to oppose the signal of said first signal means, third signal means for providing a signal in accordance with the displacement of the trim tab from a null position, and means for modifying the signal of said repeatback means in accordance with said third signal means.

2. In an automatic pilot for dirigible craft having a main control surface and a trim tab, motive means connected to said surface and trim tab, first signal means for operating said motive means in response to displacement of the craft from a reference position, and second signal means for operating said motive means in accordance with the displacement of the trim tab from a null position and effective to replace the signal of said first signal means upon occurrence of a persistent disturbing moment and thereby permit the craft to return to its reference position.

3. An object controlling servo system for controlling the position of an object in accordance with both transient and persistent departures thereof from a reference position so as to return said object to said reference position comprising means for defining said reference position, control means positionable from a neutral position corresponding to said reference position and responsive to departures of said object from said reference position for returning said object to said reference position after a departure therefrom, means carried by said control means and responsive only to a persistent departure of said object from said reference position for controlling the position of said control means whereby to control the position of said object in accordance with said persistent departure, and means responsive to the position of said last-mentioned means for correspondingly shifting the neutral position of said control means in accordance with said persistent departure whereby to allow said object to return to said reference position.

4. An automatic pilot for aircraft for controlling the attitude of said aircraft in response to both transient and persistent departures thereof from a reference attitude comprising means for defining said reference attitude, a first control surface positionable from a neutral position corresponding to said reference attitude and responsive to departures of said craft from said reference attitude for returning said craft to said reference attitude after a departure therefrom, a second control surface carried by said first control surface and responsive only to persistent departures in the attitude of said aircraft from the reference attitude for maintaining the position of said first control surface required to arrest said persistent departure, and means responsive to the position of said second control surface for correspondingly shifting the neutral position of said first control surface in a direction and to an amount to eliminate said persistent departure and allow said craft to return to said reference attitude.

5. A servo system for controlling the position of an object in accordance with both transient and persistent departures thereof from a reference position so as to return said object to said reference position comprising means for defining a reference position and for supplying a departure signal having both transient and persistent characteristics, first means positionable from a neutral position corresponding to said reference position and responsive to the transient characteristics of said departure signal for controlling the position of said object whereby to return it to said reference position after a transient departure therefrom, second means carried by said first means and responsive only to the persistent characteristics of said departure signal for controlling the position of said first means whereby to control the position of said object in accordance with persistent departures of said object from said reference position, and means responsive to the position of said second means for shifting the neutral position of said first means in a direction and to an amount to eliminate said persistent characteristic of the departure signal from said reference device whereby to allow said object to return to said reference position.

6. Aircraft control apparatus comprising in combination, means for defining a reference attitude for said aircraft including means for supplying signals proportional to both transient and persistent departures in the attitude of said craft therefrom, a first control surface positionable from a neutral position corresponding to said reference attitude and responsive to said transient departure signals for controlling the attitude of said craft whereby to return the same to said reference attitude after a transient departure therefrom, a second control surface carried by said first control surface for controlling the position of said first control surface and responsive only to said persistent departure signal whereby to control the attitude of said craft in accordance with said latter signal characteristic, and means responsive to the position of said second control surface for shifting the neutral position of said first control surface in a direction and to an amount to eliminate said persistent departure signal from said reference device and thereby permit said craft to return to said reference attitude.

7. An automatic pilot for air craft having a first control surface movable from a neutral position corresponding to a reference attitude for controlling the attitude of said craft about an axis thereof in response to transient departures of said craft from said reference attitude and a second movable control surface movable from a neutral position relative to the position of said first surface for controlling the position of said first surface in response to persistent departures of said craft from said reference attitude, attitude reference means for providing a signal corresponding to departures of said craft from said reference attitude of both transient and persistent natures, a first servomotor responsive to a transient control signal from said reference means for operating said first surface in accordance therewith, a second servomotor responsive to a persistent control signal from said reference means for operating said second surface in accordance therewith, and means responsive to the position of said second surface relative to said first surface for shifting the neutral position of said first surface in a direction and to an amount to reduce the persistent control signal from said attitude reference means to zero whereby to allow said craft to return to said reference attitude.

8. An automatic pilot for aircraft having a first control surface movable from a neutral position corresponding to a reference craft attitude for controlling said craft attitude about an axis thereof in response to transient departures of said craft from said reference attitude and a second movable control surface movable from a neutral position relative to the position of said first surface for controlling the position of said first surface in response to persistent departures of said craft from said reference attitude, attitude reference means for providing a signal corresponding to departures of said craft from said reference attitude of both transient and persistent natures, a first servomotor responsive to both transient and persistent control signals from said reference means for operating said first surface in accordance therewith, means responsive to the displacement of said first surface for providing a feedback signal in opposition to said control signals whereby to position said first surface in accordance therewith, a second servomotor connected to receive said attitude reference signals and responsive only to the persistent nature thereof for operating said second surface in accordance therewith, and means responsive to the position of said second surface relative to said first surface for modifying said feedback signal in accordance with a persistent displacement of said second surface whereby to shift the neutral position of said first surface to thereby reduce said persistent control signal to zero and allow said craft to return to said reference attitude.

9. An automatic trim control system for aircraft having a main control surface for controlling the attitude of said aircraft and an auxiliary control surface carried by said main surface for aerodynamically controlling said main control surface comprising means for defining a reference craft attitude, first means positionable from a neutral position corresponding to said reference attitude and responsive to said reference means for positioning said main control surface in accordance with both transient and persistent departures of said craft from said reference attitude whereby to return said craft toward said reference attitude, and second means responsive only to persistent departures of said craft from said reference attitude for positioning said auxiliary control surface in an amount to aerodynamically maintain said main control surface at a position to counteract said persistent departure, and means responsive to the operation of said second means for shifting the neutral position of said main control surface with respect to said reference attitude responsive means in a direction and to an amount to eliminate said persistent departure from said reference attitude whereby to allow said aircraft to return to said reference attitude.

References Cited in the file of this patent

UNITED STATES PATENTS

| | | |
|---|---|---|
| 2,545,343 | Conviser | Mar. 13, 1951 |
| 2,594,326 | MacCallum | Apr. 29, 1952 |
| 2,723,089 | Schuck et al. | Nov. 8, 1955 |
| 2,733,879 | Noxon | Feb. 7, 1956 |